US008255078B2

(12) United States Patent
Otsuki et al.

(10) Patent No.: US 8,255,078 B2
(45) Date of Patent: Aug. 28, 2012

(54) NUMERICAL CONTROLLER FOR MULTI-AXIS MACHINE TOOL

(75) Inventors: Toshiaki Otsuki, Minamitsuru-gun (JP); Soichiro Ide, Minamitsuru-gun (JP); Osamu Hanaoka, Minamitsuru-gun (JP); Takafumi Sasaki, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 1 day.

(21) Appl. No.: 13/038,600

(22) Filed: Mar. 2, 2011

(65) Prior Publication Data
US 2011/0276173 A1 Nov. 10, 2011

(30) Foreign Application Priority Data

May 10, 2010 (JP) .................................. 2010-108639

(51) Int. Cl.
*G05B 19/19* (2006.01)
(52) U.S. Cl. .................... 700/186; 700/189; 700/193
(58) Field of Classification Search ................ 700/159, 700/160, 173, 174, 175, 176, 186, 189, 193; 318/568.12, 568.15, 568.19, 568.22, 569, 318/572, 573
See application file for complete search history.

(56) References Cited

U.S. PATENT DOCUMENTS

| 6,775,586 | B2 | 8/2004 | Shibata et al. |
| 7,283,889 | B2 | 10/2007 | Otsuki et al. |
| 7,571,027 | B2 | 8/2009 | Freeman |
| 7,869,897 | B2* | 1/2011 | Otsuki et al. .................. 700/189 |
| 7,969,111 | B2* | 6/2011 | Otsuki et al. .................. 318/572 |
| 8,024,068 | B2* | 9/2011 | Gray .............................. 700/252 |
| 8,041,447 | B2* | 10/2011 | Otsuki et al. .................. 700/174 |
| 2003/0120376 | A1 | 6/2003 | Shibata et al. |
| 2003/0192867 | A1* | 10/2003 | Yamazaki et al. ........ 219/121.78 |
| 2005/0033459 | A1* | 2/2005 | Otsuki et al. .................... 700/61 |
| 2005/0107000 | A1* | 5/2005 | Otsuki et al. ...................... 451/5 |
| 2005/0234671 | A1* | 10/2005 | Morfino .......................... 702/95 |
| 2008/0058982 | A1* | 3/2008 | Gray ............................. 700/159 |
| 2008/0058984 | A1* | 3/2008 | Gray et al. ..................... 700/192 |
| 2008/0288103 | A1* | 11/2008 | Otsuki et al. .................. 700/189 |
| 2009/0093905 | A1* | 4/2009 | Otsuki et al. .................. 700/174 |
| 2009/0140684 | A1* | 6/2009 | Otsuki et al. .................. 318/572 |

FOREIGN PATENT DOCUMENTS

| EP | 2 199 882 | 6/2010 |
| JP | 9-201784 A | 8/1997 |
| JP | 2003-195917 | 7/2003 |
| JP | 2004-272887 A | 9/2004 |
| JP | 2007-203380 A | 8/2007 |

* cited by examiner

*Primary Examiner* — Charles Kasenge
(74) *Attorney, Agent, or Firm* — Drinker Biddle & Reath LLP

(57) ABSTRACT

A numerical controller for controlling a multi-axis machine tool having three linear axes and three rotating axes obtains an interpolated tool direction vector by interpolating a tool direction command and computes multiple solutions for three rotating axes from the vector. The three rotating axis positions are computed by synthesizing these multiple solutions. The three linear axis positions on a machine coordinate system are computed by adding to the interpolated tool center point position the product of the interpolated tool direction vector, or a verified tool direction vector based on the three rotating axis positions determined by the rotating axis position computing means, and a tool length compensation amount. The three rotating axes are moved to the positions computed above and the three linear axes are moved to the positions computed above.

13 Claims, 11 Drawing Sheets

MACHINE COORDINATE SYSTEM,
COMMAND PROGRAM COORDINATE SYSTEM

MACHINE COORDINATE SYSTEM,
COMMAND PROGRAM COORDINATE SYSTEM

| FIXED AXIS | AXIS POSITION TO BE DETERMINED |
|---|---|
| A AXIS | B AND C AXES (FIRST ROTATING AXIS FIXED SOLUTION) |
| B AXIS | A AND C AXES (SECOND ROTATING AXIS FIXED SOLUTION) |
| C AXIS | A AND B AXES (THIRD ROTATING AXIS FIXED SOLUTION) |

INITIAL POSITIONS
OF B AND C AXES
(B=C=0 DEGREES)

NUMERICAL CONTROLLER FOR MULTI-AXIS MACHINE TOOL

RELATED APPLICATION DATA

This application claims priority under 35 U.S.C. §119 and/or §365 to Japanese Application No. 2010-108639 filed May 10, 2010, the entire contents of which is incorporated herein by reference.

BACKGROUND OF THE INVENTION

1. Field of the Invention

The present invention relates to a numerical controller for controlling a machine tool, and in particular relates to a numerical controller for controlling a multi-axis machine tool for machining a workpiece (object to be machined) attached to a table using a mechanism including at least three linear axes and at least three rotating axes for rotating the table or a tool head.

2. Description of the Related Art

Five-axis machine tools having three linear axes (X, Y, and Z axes) and two rotating axes are becoming common. These five-axis machine tools are classified into three types: a head rotating type having two rotating axes on the tool head side, a table rotating type having two rotating axes on the table side, and a mixed type having one rotating axis on the tool head side and one rotating axis on the table side. Japanese Patent Application Laid-Open No. 2003-195917, (corresponding to United States Patent Application Publication No. US2003/0120376 A1) discloses a technique for machining a workpiece by controlling a tool center point, wherein the tool center point is instructed with the positions of linear axes on a command program coordinate system and a direction of a tool relative to a workpiece is instructed by a tool direction command.

In this five-axis machine tool, however, there is at least one singular point at which rotating axes largely move. To handle this problem, U.S. Pat. No. 7,571,027, for example, proposes a method for avoiding large movements of rotating axes by determining whether or not the tool direction of a five-axis kinematic assembly is close to a singular point and generating a virtual axis near the singular point if determined that the tool direction is close to a singular point. It appears, however, that the method disclosed in that U.S. Pat. No. 7,571,027 has the following problems:

(1) Although a virtual axis is generated to determine the amount of movement, the virtual axis, which does not actually exist, does not actually move. It is predicted, therefore, that an error would occur at the machining point although the large movements of the rotating axes could be avoided.

(2) Because it is determined whether or not the tool direction is close to a singular point, there may occur a case in which the tool direction is determined to be close to a singular point on one of the substantially identical paths but the tool direction may be determined not to be close to a singular point on the other path. In this case, the tool would move very differently even on the substantially identical machining paths. Consequently, grooves or differences in level may be formed on the machined surface.

Recently, a tool head for head rotating type multi-axis machine tools having three rotating axes as shown in FIGS. 1 and 2 is used. In addition, mixed type multi-axis machine tools having two table rotating axes and one head rotating axis as shown in FIG. 3 are also used. Mixed type multi-axis machine tools having one table rotating axis and two head rotating axes as shown in FIG. 4 and table rotating type multi-axis machine tools having three table rotating axes as shown in FIG. 5 are also contemplated as machine structures. There has been no technique, however, for numerically controlling the tool center point for such machine tools of multi-axis configuration.

SUMMARY OF THE INVENTION

An object of the present invention is to provide a numerical controller for controlling a multi-axis machine tool having three rotating axes, which controls a tool center point, and in particular, to provide a numerical controller which can, in tool center point control in which a tool center point position is instructed by positions of linear axes on a command program and the direction of a tool relative to a workpiece is instructed, (a) prevent large movements of the rotating axes near singular points without generating machining error, which would have been difficult to avoid in five-axis machine tools having two rotating axes, and (b) prevent largely different movements of rotating axes on two substantially identical machining paths, which may occur when the tool direction is determined to be close to a singular point on one of the substantially identical paths whereas the tool direction is determined not to be close to a singular point on the other path.

In other words, according to the numerical controller of the present invention, if two machining paths are almost the same, then the paths in which large movements of rotating axes near singular points are prevented become substantially the same, too.

To achieve the above object, the present invention provides a numerical controller for controlling a multi-axis machine tool having three rotating axes, as a numerical controller controlling a tool center point, which has the following features.

The multi-axis machine tool to be controlled by the numerical controller of the present invention has a mechanism including at least three linear axes and at least three rotating axes for machining a workpiece attached to a table by rotating the table or a tool head. The numerical controller is adapted to instruct a tool center point position by linear axis positions on a command program coordinate system and giving a tool direction command to the multi-axis machine tool. The numerical controller comprises: rotating-axis multiple solutions computing means for obtaining an interpolated tool direction vector by interpolating the tool direction command for every interpolation period and computing multiple solutions for the three rotating axes from the interpolated tool direction vector; rotating axis position computing means for computing three rotating axis positions by synthesizing the computed multiple solutions; and linear axis position computing means for obtaining an interpolated tool center point position by interpolating the tool center point position instructed for every interpolation period and then computing three linear axis positions on a machine coordinate system from the interpolated tool center point position, a tool length compensation amount and the positions of the rotating axes. And the numerical controller is operable to move the three rotating axes to the rotating axis positions determined by the rotating axis position computing means and to move the three linear axes to the linear axis positions determined by the linear axis position computing means.

The linear axis position computing means may calculate the linear axis positions of the three linear axes on the machine coordinate system by multiplying the tool length compensation amount by the interpolated tool direction vector and adding the result to the interpolated tool center point position.

The rotating axis position computing means may calculate the rotating axis positions of the three rotating axes by synthesizing the computed multiple solutions and obtain a verified tool direction vector which is a tool direction vector to be obtained from the calculated rotating axis positions of the three rotating axes. And the linear axis position computing means may calculate the linear axis positions of the three linear axes on the machine coordinate system by multiplying the tool length compensation amount by the verified tool direction vector and adding the result to the interpolated tool center point position.

The linear axis position computing means calculates the linear axis positions of the three linear axes on the machine coordinate system from the tool length compensation amount, the rotating axis positions of the three rotating axes and the interpolated tool center point position, using equation (10-3) described later.

The multiple solutions may include a first rotating axis fixed solution assuming that a first rotating axis does not move, a second rotating axis fixed solution assuming that a second rotating axis does not move, and a third rotating axis fixed solution assuming that a third rotating axis does not move. Alternatively, the multiple solutions may include a first rotating axis fixed solution to be obtained when assuming that a first rotating axis moves through a first rotating axis motion amount determined in a previous interpolation period, a second rotating axis fixed solution to be obtained when assuming that a second rotating axis moves through a second rotating axis motion amount determined in the previous interpolation period, and a third rotating axis fixed solution to be obtained when assuming that a third rotating axis moves through a third rotating axis motion amount determined in the previous interpolation period.

The rotating axis position computing means may calculate evaluation values for highly evaluating smaller motion amounts in the multiple solutions, respectively, and synthesizes the products of the motion amounts obtained respectively by the multiple solutions and the evaluation values.

The rotating axis position computing means may determine the verified tool direction vector from the determined three rotating axis positions, verifies whether or not a difference between the verified tool direction vector and the interpolated tool direction vector is within a preset tolerance, and, if the difference is not within the tolerance, repeats computing the positions of rotating axes by computing again the evaluation values so that the smaller amounts of motion are more highly evaluated.

The multi-axis machine tool may rotate the tool head by the three rotating axes, the multi-axis machine tool may rotate the table by two of the three rotating axes and rotate the tool head by the remaining one rotating axis, the multi-axis machine tool may rotate the tool head by two of the three rotating axes and rotate the table by the remaining one rotating axis, or the multi-axis machine tool may rotate the table by the three rotating axes.

The tool direction command may be instructed by a tool direction vector, may be instructed by two rotating axis positions, may by instructed by three rotating axis positions.

With the above configuration, the present invention can provide a numerical controller controlling a tool center point, which controls machining of workpiece by instructing a tool center point position with positions of linear axes on a command program coordinate system and instructing the direction of a tool relative to a workpiece, characterized in that the numerical controller can prevent large movements of rotating axes near a singular point without generating machining error, which would have been difficult to avoid in five-axis machine tools having two rotating axes, and also can prevent largely different movements on two substantially identical machining paths, which would occur when a tool direction is determined to be close to the singular point on one of the two substantially identical machining paths whereas the tool direction is determined not to be close to a singular point on the other path.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

The present invention is characterized in how the rotating axes are controlled for controlling the tool center point when the tool center point position and the tool direction are instructed. Accordingly, in the following description, focus will be placed on a tool direction command and the corresponding control of the rotating axes for controlling the tool center point.

In general, when a tool direction $(i, j, k)^T$ relative to a workpiece is given, the corresponding positions of three rotating axes are not determined analytically and uniquely. This is generally called inverse kinematic calculation.

In the present invention, therefore, the A, B, and C axis positions are calculated from the tool direction $(i, j, k)^T$ in a given interpolation period as generally described below. Here, the first rotating axis will be referred to as A axis, the second rotating axis as B axis, and the third rotating axis as C axis. Here, '$T$' indicating transposition will not be specified when it is self-evident.

Figures 5, 6:
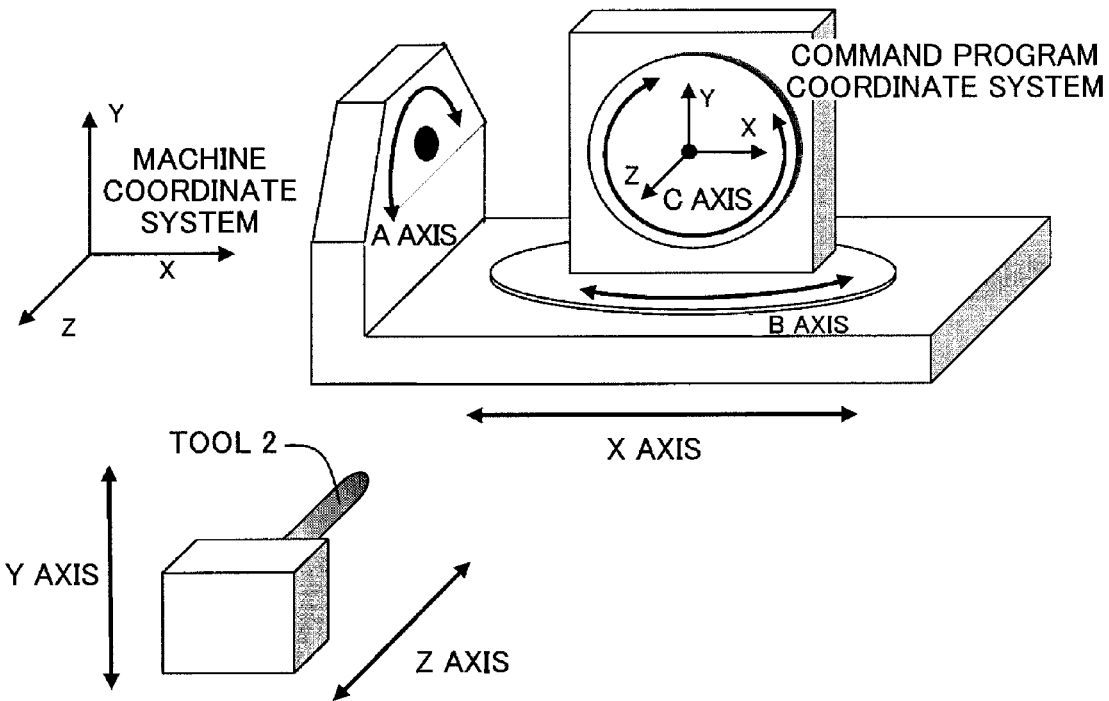
FIG. 5 illustrates a table rotating type multi-axis machine tool.
FIG. 6 illustrates how to obtain the positions of two of the three rotating axes (A, B, and C axes) with remaining one fixed.

FIG. 6 illustrates that one of the three rotating axes (A, B, and C axes) is fixed and the remaining two axis positions are determined. When the position of one of the three axes is fixed, the positions of the remaining two axes can be analytically and uniquely determined.

From among the periodic solutions for every $2\pi$ radian and positive and negative solutions generated from trigonometric function calculations for the first rotating axis fixed solution (A axis fixed solution), second rotating axis fixed solution (B axis fixed solution), and third rotating axis fixed solution (C axis fixed solution), solutions closer to the A, B, and C axis positions in the immediately previous interpolation period are selected. An evaluation value for highly evaluating a smaller amount of motion is calculated for each of the first rotating axis fixed solution (A axis fixed solution), second rotating axis fixed solution (B axis fixed solution), and third rotating axis fixed solution (C axis fixed solution). Then those calculated evaluation values are multiplied by the amounts of motion of the solutions respectively, and the results of multiplication are added up. An example of a multi-axis machine tool equipped with the first rotating axis (A axis), second rotating axis (B axis) and third rotating axis (C axis) is shown in FIGS. 1-5. Here, it is assumed that the A axis is an axis rotating about the X axis, the B axis is an axis rotating about the Y axis, and the C axis is an axis rotating about the Z axis.

Accordingly, three rotating axis positions with the smallest amounts of motion possible on the coordinate system can be obtained. Consequently, large movements of the rotating axes near the singular points can be prevented.

In the present invention, a specific range near the singular point need not be set. Accordingly, such an operation does not occur as the movements of the rotating axes would largely differ on substantially identical paths in the case in which the tool direction is determined to be close to the singular point on one of the paths whereas it is not determined to be close on the other path by comparing the tool direction with a specific range near the singular point. This means that, if two paths are substantially the same, movements of the rotating axes near the singular point hardly differ on these two paths.

First Embodiment of the Present Invention

In this embodiment, the tool direction is instructed by a tool direction vector (ic, jc, kc). This embodiment will be described below.

Figure 1:
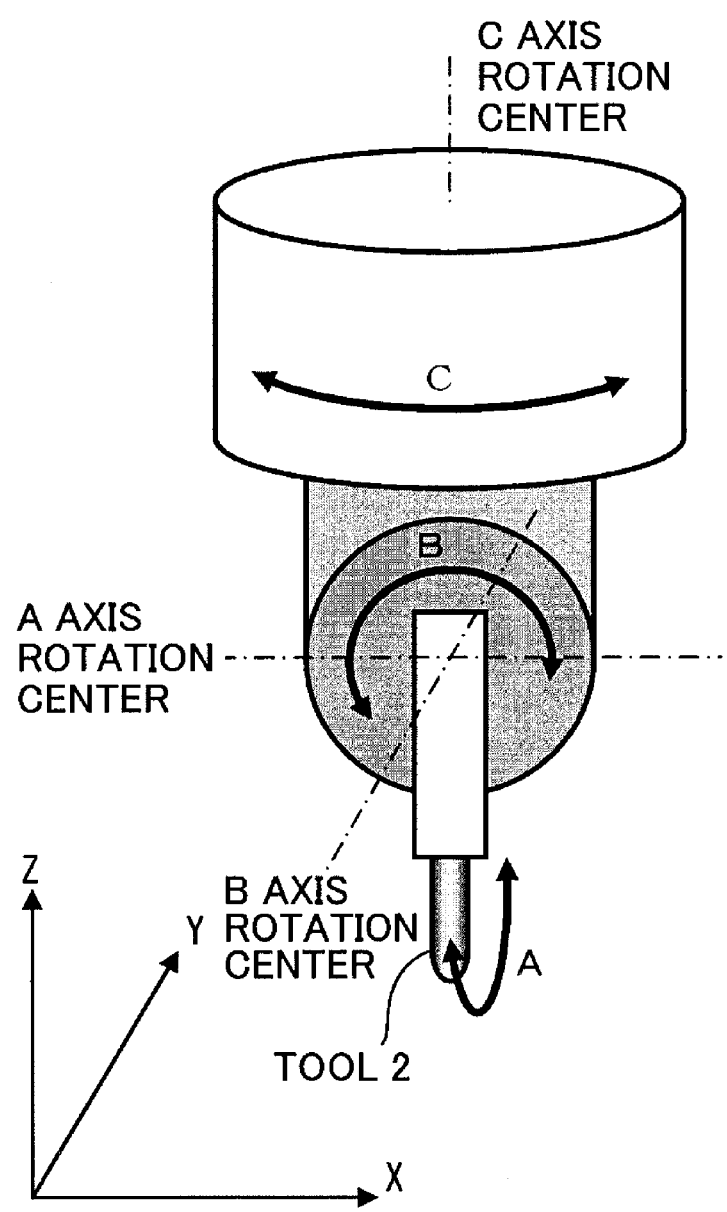
FIG. 1 is a perspective view, from the negative side of the Y axis, schematically showing a tool head for a head rotating type multi-axis machine tool equipped with three rotating axes.
Figure 2:
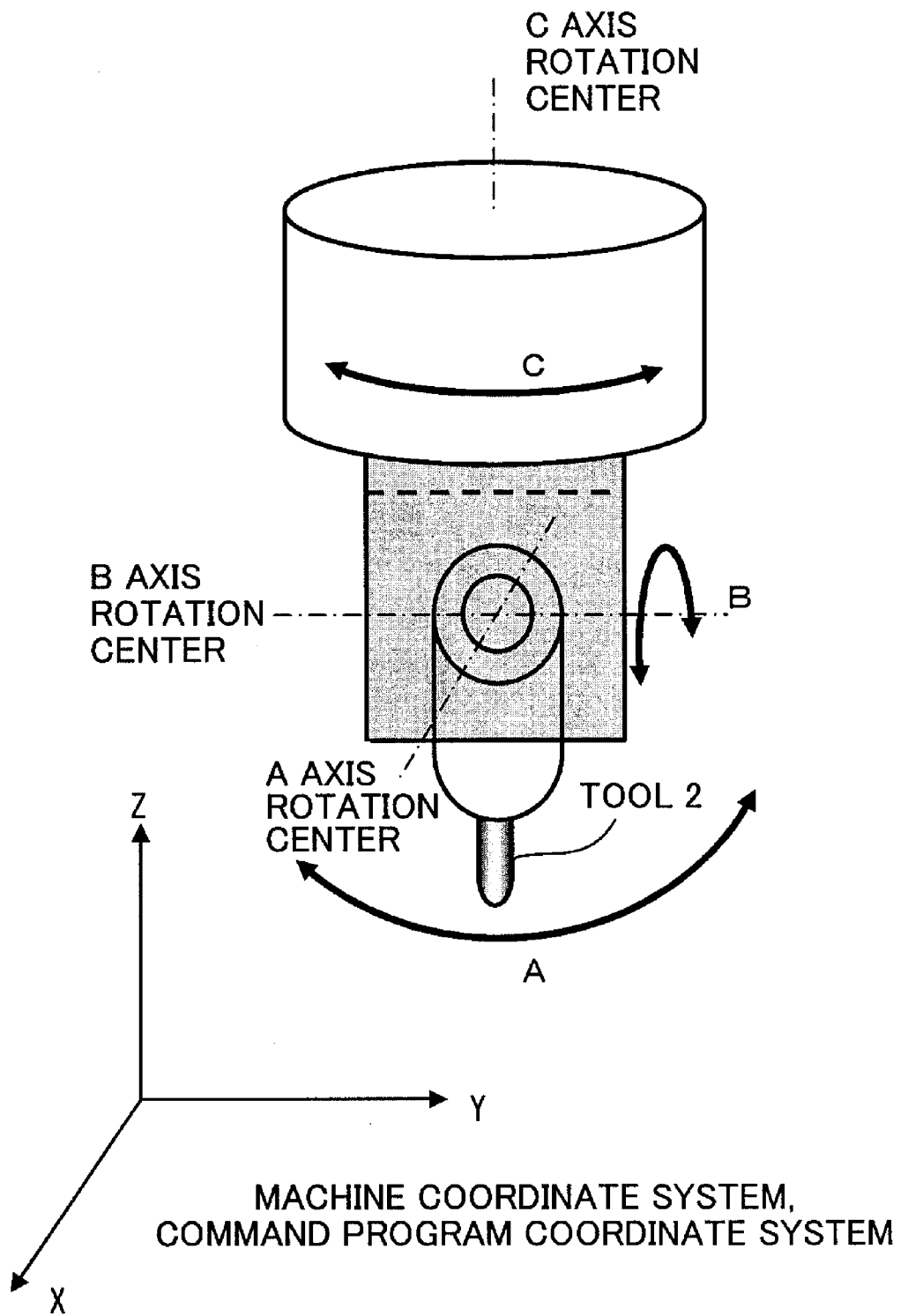
FIG. 2 is a perspective view, from the positive side of the X axis, showing the tool head shown in FIG. 1.

Suppose that the head rotating type multi-axis machine tool shown in FIGS. 1 and 2 is controlled. The central axes of the rotating axes intersect with each other. The A and B axes have a movable range from −90 degrees to +90 degrees, while the C axis is movable through any number of rotations. The A axis position is expressed by a (radian), the B axis position is expressed by b (radian), and the C axis position is expressed by c (radian). It is assumed that, when a=b=c=0, the tool direction coincides with the direction of the Z axis as shown in FIGS. 1 and 2.

The machine coordinate system is a coordinate system fixed in the machine. The command program coordinate system is a coordinate system representing the positions instructed by a command program. In the command program, the tool center point position on the command program coordinate system is instructed by the command positions (xc, yc, zc) on the linear axes X, Y, and Z and the tool direction command is given with a command tool direction vector (ic, jc, kc). The tool center point position and the tool direction are interpolated for every interpolation period and the interpolated tool center point position (xi, yi, zi) and the interpolated tool direction vector (i, j, k) are obtained. Here, (i, j, k) is a unit vector.

Figure 7:
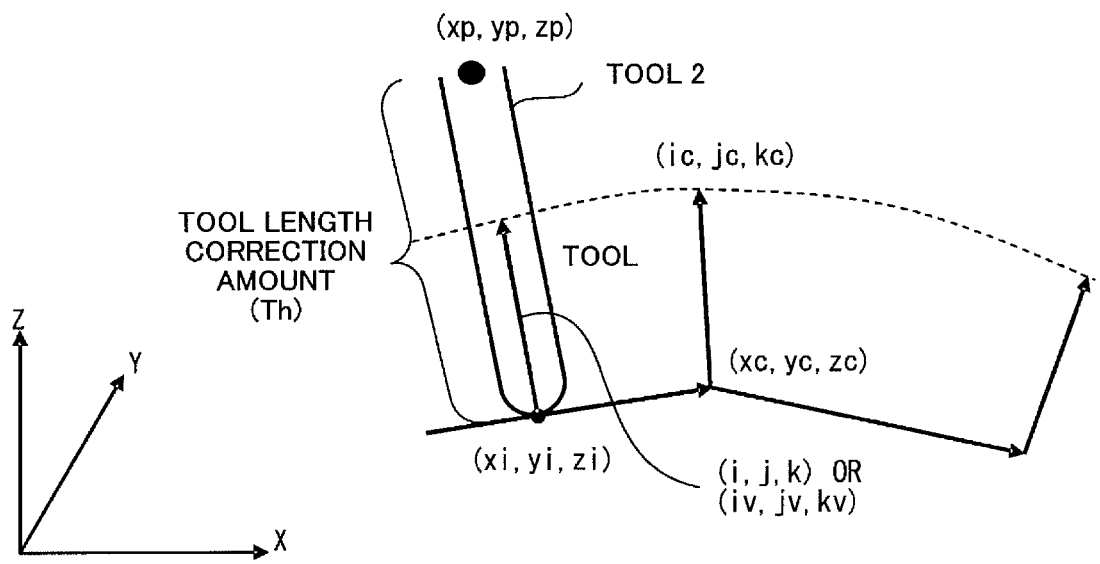
FIG. 7 illustrates an interpolated tool direction vector for the head rotating type multi-axis machine tool shown in FIGS. 1 and 2.

FIG. 7 illustrates an interpolated tool direction vector for the head rotating type multi-axis machine tool shown in FIGS. 1 and 2. In this figure, (xp, yp, zp) are the positions on the linear axes described later.

The relationship expressed by the following equation (1) is established between the interpolated tool direction vector (i, j, k) and the A, B, and C axis positions a, b, and c. This conversion equation depends on the machine configuration.

$$\begin{bmatrix} i \\ j \\ k \end{bmatrix} = \begin{bmatrix} \cos c & -\sin c & 0 \\ \sin c & \cos c & 0 \\ 0 & 0 & 1 \end{bmatrix} \begin{bmatrix} \cos b & 0 & \sin b \\ 0 & 1 & 0 \\ -\sin b & 0 & \cos b \end{bmatrix} \quad (1)$$

$$\begin{bmatrix} 1 & 0 & 0 \\ 0 & \cos a & -\sin a \\ 0 & \sin a & \cos a \end{bmatrix} \begin{bmatrix} 0 \\ 0 \\ 1 \end{bmatrix}$$

$$= \begin{bmatrix} \cos c \sin b \cos a + \sin c \sin a \\ \sin c \sin b \cos a - \cos c \sin a \\ \cos b \cos a \end{bmatrix}$$

When the vector (i, j, k) is given, (a, b, c) cannot be determined analytically and uniquely. Therefore, (a, b, c) is obtained with the A axis position fixed (A axis fixed solution (first rotating axis fixed solution)), (a, b, c) is obtained with the B axis position fixed (B axis fixed solution (second rotating axis fixed solution)), and (a, b, c) is obtained with the C axis position fixed (C axis fixed solution (third rotating axis fixed solution)). As the position of the axis to be fixed (A, B, or C axis), the position of the same axis determined in the previous interpolation period may be used, or alternatively the position of the same axis determined in the previous interpolation period plus the amount of motion of the same axis in the previous interpolation period may be used (assuming that the amount of motion of the same axis in the current interpolation period is equal to the amount of motion of the same axis in the previous interpolation period). Several other options are contemplated. For example, the difference in the amount of motion between the interpolation period immediately preceding the previous interpolation period and the previous interpolation period may be added as an acceleration.

Described below are the cases in which the A axis position is fixed, the B axis position is fixed, and the C axis position is fixed.

<A Axis Fixed Solution (First Rotating Axis Fixed Solution)>

The A axis position a0 determined in the previous interpolation period is used as the A axis positional to be fixed, or the A axis position a0 determined in the previous interpolation period plus the A axis motion amount Δa0 in the previous interpolation period (a0+Δa0) is used as the A axis positional to be fixed, assuming that the A axis motion amount in the current interpolation period is equal to the A axis motion amount $\Delta a0$ in the previous interpolation period.

Assuming that the B and C axis positions b and c to be obtained by the first rotating axis fixed solution are b1 and c1, respectively, b1 and c1 can be calculated as in the following equations (2) by solving the equation (1) with a1, i, j, k. Here, n is an integer.

$$b1 = \pm\cos^{-1}\left(\frac{k}{\cos a1}\right) \qquad (2)$$

$$c1 = \sin^{-1}\left(\frac{\sin b1 \cos a1}{\sqrt{i^2+j^2}}\right) - \tan^{-1}\left(\frac{i}{j}\right) + n*2\pi$$

Here, the + and − signs and integer n are determined so that b1 and c1 become close to the B and C axis positions in the previous interpolation period. Alternatively, the + and − signs and integer n may be determined so that b1 and c1 become close to the B and C axis positions in the A axis fixed solution in the previous interpolation period.

If both the denominator (cos a1) and the numerator (k) are 0 (zero) in the parentheses ( ) following $\cos^{-1}$ in the calculation of b1 in the above equations (2), b1 will become indefinite. If the absolute value in the parentheses ( ) following $\cos^{-1}$ is greater than 1, no solution will result. In this case, b1 is set to the B axis position in the previous interpolation period, or the evaluation value for the first rotating axis fixed solution described later is set to 0. The same applies to the calculation of c1.

Such processing as fixing the positions of axes, determining of plus (+) and minus (−) signs and integer value, and processing for indefinite and no-solution cases also apply to the calculations for the second and third rotating axis fixed solutions.

<B Axis Fixed Solution (Second Rotating Axis Fixed Solution)>

The B axis position b0 determined in the previous interpolation period is used as the B axis position b2 to be fixed, or the B axis position b0 determined in the previous interpolation period plus the B axis motion amount $\Delta b0$ in the previous interpolation period (b0+$\Delta b0$) is used as the B axis position b2 to be fixed, assuming that the B axis motion amount in the current interpolation period is equal to the B axis motion amount $\Delta b0$ in the previous interpolation period.

Assuming that the A and C axis positions a and c to be obtained by the second rotating axis fixed solution are a2 and c2, respectively, a2 and c2 can be calculated as in the following equations (3) by solving the equation (1) with b2, i, j, k. Here, m is an integer.

$$a2 = \pm\cos^{-1}\left(\frac{k}{\cos b2}\right) \qquad (3)$$

$$c2 = \sin^{-1}\left(\frac{\sin b2 \cos a2}{\sqrt{i^2+j^2}}\right) - \tan^{-1}\left(\frac{i}{j}\right) + m*2\pi$$

<C Axis Fixed Solution (Third Rotating Axis Fixed Solution)>

The C axis position c0 determined in the previous interpolation period is used as the C axis position c3 to be fixed, or the C axis position c0 determined in the previous interpolation period plus the C axis motion amount $\Delta c0$ in the previous interpolation period (c0+$\Delta c0$) is used as the C axis position c3 to be fixed, assuming that the C axis motion amount in the current interpolation period is equal to the C axis motion amount $\Delta c0$ in the previous interpolation period.

Assuming that the A and B axis positions a and b to be obtained by the third rotating axis fixed solution are a3 and b3, respectively, a3 and b3 can be calculated as in the following equations (4) by solving equation (1) with c3, i, j, k.

$$a3 = \sin^{-1}(i\sin c3 - j\cos c3) \qquad (4)$$

$$b3 = \tan^{-1}\left(\frac{i\cos c3 - j\sin c3}{k}\right)$$

Figure 8:
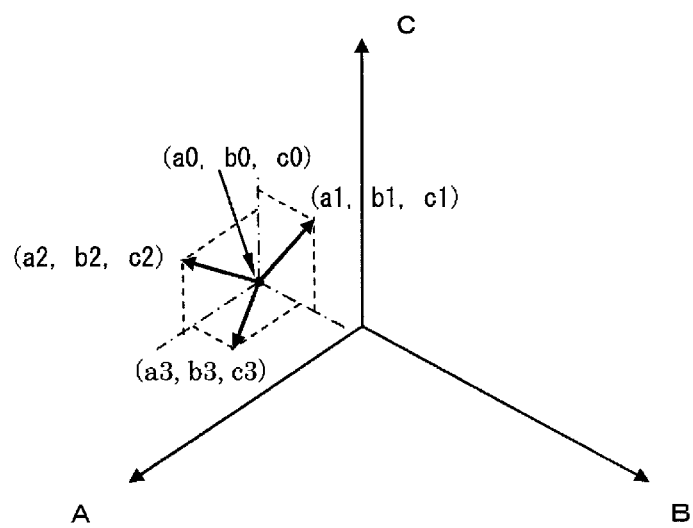
FIG. 8 shows A, B, and C axis fixed solutions on ABC axis coordinates, calculated assuming that the A, B, and C axis positions to be fixed are the A, B, and C axis positions (a0, b0, c0) determined in the previous interpolation period.

The A, B, and C axis fixed solutions calculated with the A, B, and C axis positions fixed at the A, B, and C axis positions (a0, b0, c0) determined in the previous interpolation period are represented on A, B, and C axis coordinates as shown in FIG. 8.

Next, temporary evaluation values V1', V2', V3' are determined for the first, second, and third rotating axis fixed solutions. The temporary evaluation values are values for highly evaluating smaller synthesized motion amounts of the axes (A, B, and C axes) obtained from the solutions. For example, the values calculated by the following equations (5) are used as the temporary evaluation values. Here, a0, b0, and c0 are the A, B, and C axis positions in the previous interpolation period. w is an exponent value (power index) indicating how much a smaller amount of motion is evaluated.

$$V1' = \left(\frac{1}{\sqrt{(a1-a0)^2 + (b1-b0)^2 + (c1-c0)^2}}\right)^w \qquad (5)$$

$$V2' = \left(\frac{1}{\sqrt{(a2-a0)^2 + (b2-b0)^2 + (c2-c0)^2}}\right)^w$$

$$V3' = \left(\frac{1}{\sqrt{(a3-a0)^2 + (b3-b0)^2 + (c3-c0)^2}}\right)^w$$

These temporary evaluation values are taken here as examples; other equations may be used, provided that the temporary evaluation values are values that highly evaluate smaller synthesized amounts of motion of the axes (A, B, and C axes) obtained from the solutions. For example, when calculating V1', a constant BV1 may be added as in the following equation (6), or the denominator may be an absolute value of each amount of motion, or the numerator may be a constant NV1. The same applies to V2' and V3'.

$$V1' = BV1 + \left(\frac{NV1}{|a1-a0| + |b1-b0| + |c1+c0|}\right)^w \qquad (6)$$

The temporary evaluation values V1', V2', and V3' are normalized to evaluation values V1, V2, and V3. As in equations (7) below, the amounts of motion obtained by the first, second, and third rotating axis fixed solutions are multiplied by the evaluation values V1, V2, and V3, respectively, and the results of multiplication are added up.

$$a = a0 + V1(a1-a0) + V2(a2-a0) + V3(a3-a0)$$

$$b = b0 + V1(b1-b0) + V2(b2-b0) + V3(b3-b0)$$

$$c = c0 + V1(c1-c0) + V2(c2-c0) + V3(c3-c0) \qquad (7)$$

With this, the rotating axis positions (a, b, c) to which the A, B, and C axes should be moved in the current interpolation period are determined. The first, second, and third rotating axis fixed solutions are the solutions for equation (1), but a, b, c determined by equations (7) are not exactly the solutions for equation (1). Therefore, a, b, c are substituted into equation (1) to determine i, j, k for verification.

i, j, k thus determined by substituting a, b, c determined by equations (7) into equation (1) are used as a verified tool direction vector (iv, jv, kv). D is then determined as in equation (8) below and is compared with a preset tolerance D0. If D is smaller than tolerance D0, a, b, and c are the positions to which the A, B, C axes should be moved in the current interpolation period. If D is greater than tolerance D0, calculations by equations (5), (6), (7), and (8) are repeated with a greater w until D becomes smaller than tolerance D0. There are several ways to increase w. For example, the value of w may be updated by adding a certain value dw to the previous w (w←w+dw), or by multiplying the previous w with a constant kw greater than 1 (w←kw*w).

$$D = \sqrt{(i-iv)^2 + (j-jv)^2 + (k-kv)^2} \quad (8)$$

Next, a simulation example of movement of tool 2 will be described.

Figure 9:
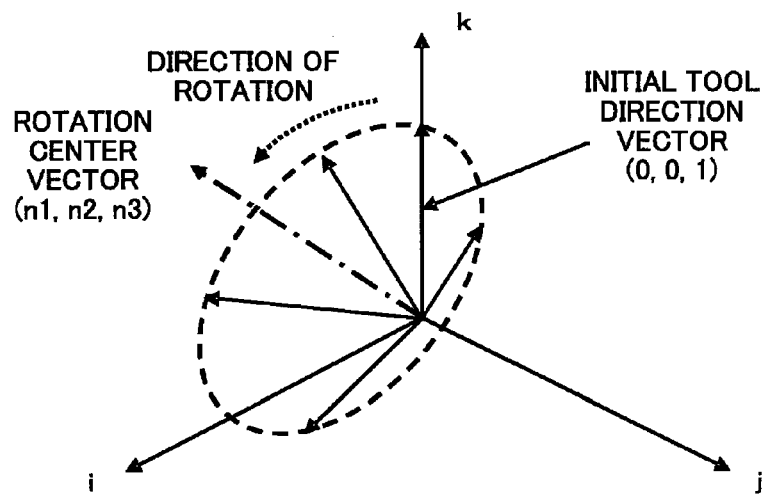
FIG. 9 illustrates how a tool direction vector changes from the initial tool direction vector (0, 0, 1)

Assume that an initial tool direction vector is (0, 0, 1). This vector is gradually rotated around a rotation center vector (n1, n2, n3), thereby giving tool direction vectors to be instructed. When the tool direction vector is (0, 0, 1), the A and B axis positions become 0 and the C axis position becomes indefinite, resulting in a singular point. Here, n1, n2, n3 are given as in equations (9) below. The tool direction vector varies as in FIG. 9.

$$n1 = \frac{1}{\sqrt{2}}$$
$$n2 = 0 \quad (9)$$
$$n3 = \frac{1}{\sqrt{2}}$$

Figure 10:
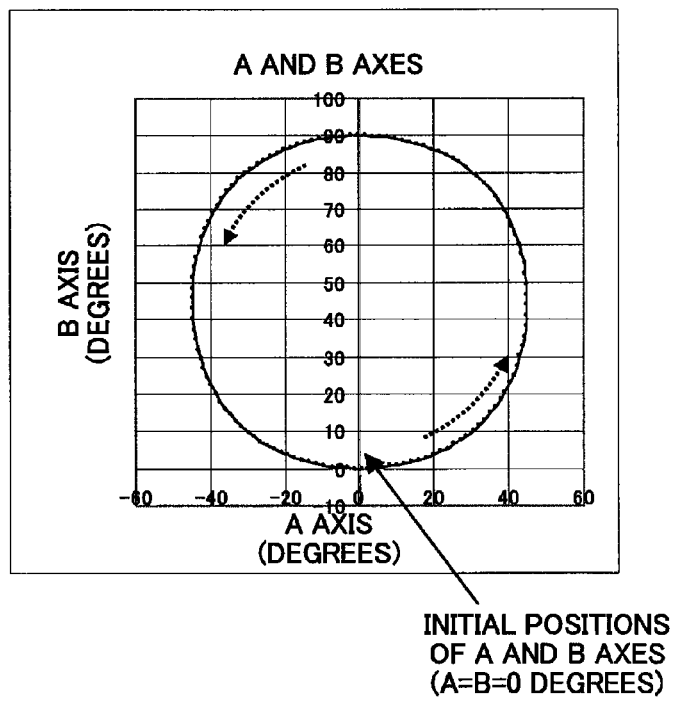
FIG. 10 illustrates the movements of the A and B axes.
Figure 11:
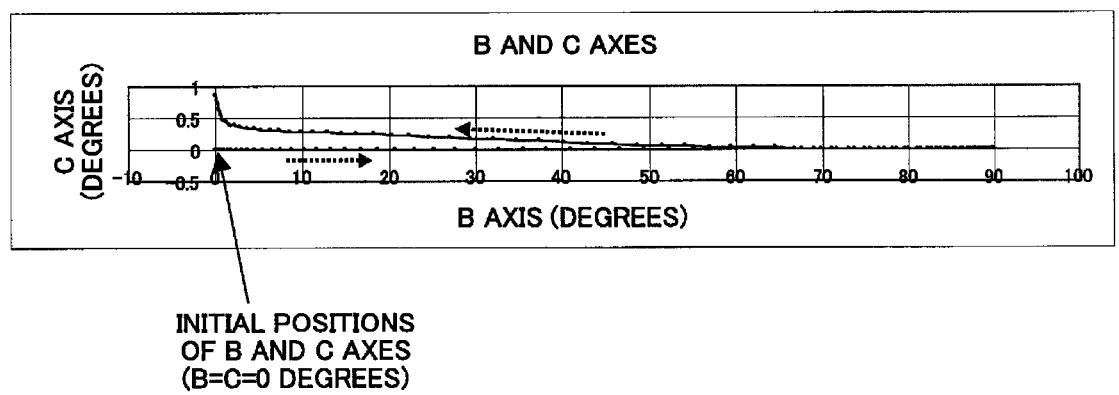
FIG. 11 illustrates the movements of the B and C axes.

When the present invention is applied to the command tool direction vector (ic, jc, kc) instructed as described above, the A and B axes move as shown in FIG. 10 and the B and C axes move as shown in FIG. 11. Large motions of the rotating axes, especially of the C axis, did not occur near the singular point.

Figure 12:
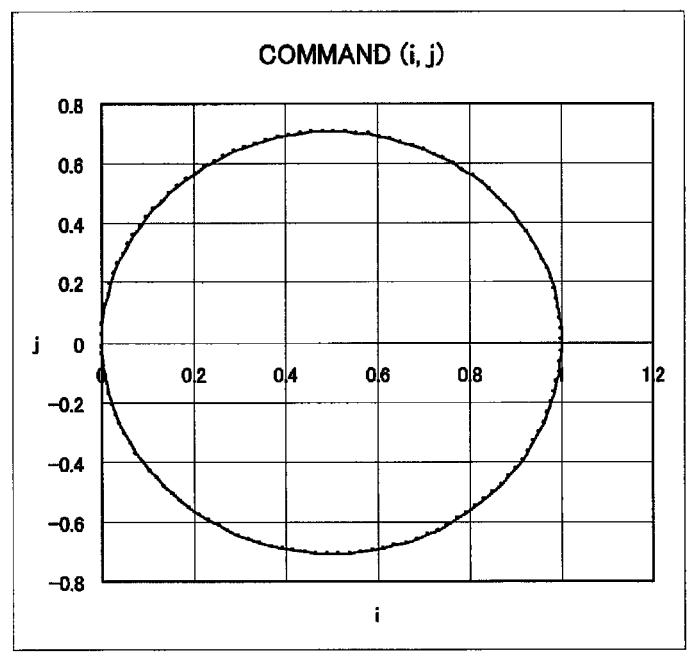
FIG. 12 illustrates and j components of interpolated tool direction vectors (i, j, k) with command tool direction vectors instructed.
Figure 13:
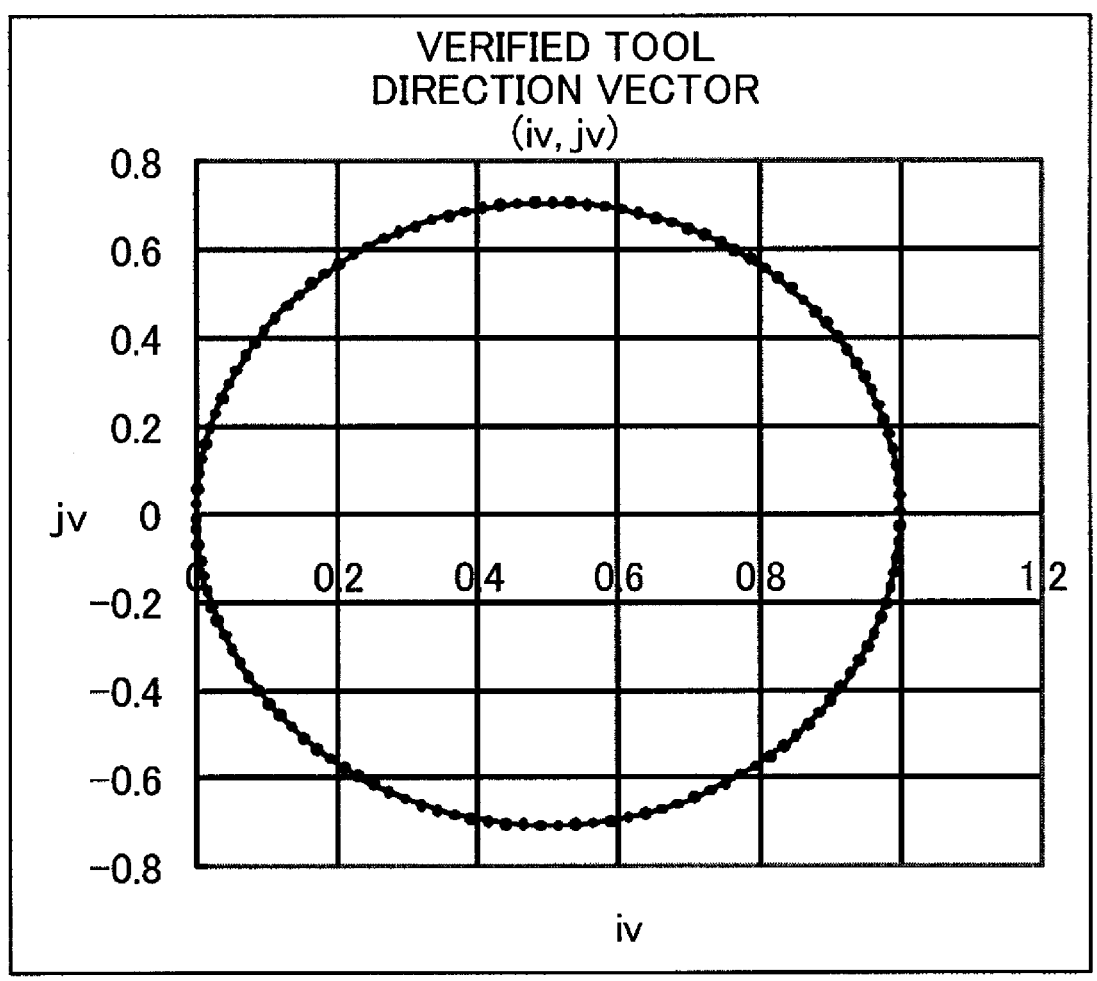
FIG. 13 illustrates iv and jv components of verified tool direction vectors (iv, jv, kv) recreated from the A, B, and C axis positions created for the interpolated tool direction vector (i, j, k)

The command tool direction vector (ic, jc, kc) instructed and the i, j components of its interpolated tool direction vector (i, j, k) are shown in FIG. 12. The iv and jv components of the verified tool direction vector (iv, jv, kv) recreated from the positions of the created A, B, and C axis are shown in FIG. 13. As can be seen from FIG. 13, machining will be performed as instructed because the tool direction vector is correctly reproduced.

The three linear axis positions (xp, yp, zp) are computed by equations (10-1) to (10-3) below. More specifically, at first, an interpolated tool center point position (xi, yi, zi) is obtained by interpolating for every interpolation period the tool center point position (xc, yc, zc) instructed by a program command, and then the product of the already determined interpolated tool direction vector (i, j, k) or the verified tool direction vector (iv, jv, kv) and a tool length compensation amount (Th) is added to the interpolated tool center point position (xi, yi, zi), thereby obtaining the three linear axis positions (xp, yp, zp) (see FIG. 7). The linear axis positions (xp, yp, zp) thus computed indicate the center of rotation of the tool head. In equation (10-1), the interpolated tool direction vector (i, j, k) is multiplied by the tool length compensation amount (Th), while in equation (10-2), the verified tool direction vector (iv, jv, kv) is multiplied by the tool length compensation amount (Th).

Incidentally, the linear axis positions (xp, yp, zp) of the three linear axes may be obtained by multiplying by a matrix of a, b and c the tool length compensation vector (Th×(0,0,1)) at the time the positions of the A, B and C axis are zero, as shown in equation (10-3) below. But, as the vector (iv, jv, kv) is obtained by substituting (a, b, c), obtained by equation (7), into equation (1), equation (10-2) is equivalent to equation (10-3). In other words, the method of obtaining the linear axis positions (xp, yp, zp) of the three linear axes by multiplying by a matrix of a, b and c the tool length compensation vector (Th×(0,0, 1)) at the time the positions of the A, B and C axis are zero in equation (10-3) is equivalent to the method of obtaining by multiplying a verified tool direction vector (iv, jv, kv) by a tool length compensation amount (Th) in equation (10-2).

$$\begin{bmatrix} xp \\ yp \\ zp \end{bmatrix} = Th * \begin{bmatrix} i \\ j \\ k \end{bmatrix} + \begin{bmatrix} xi \\ yi \\ zi \end{bmatrix} \quad (10\text{-}1)$$

$$\begin{bmatrix} xp \\ yp \\ zp \end{bmatrix} = Th * \begin{bmatrix} iv \\ jv \\ kv \end{bmatrix} + \begin{bmatrix} xi \\ yi \\ zi \end{bmatrix} \quad (10\text{-}2)$$

$$\begin{bmatrix} xp \\ yp \\ zp \end{bmatrix} = Th * \begin{bmatrix} \cos c & -\sin c & 0 \\ \sin c & \cos c & 0 \\ 0 & 0 & 1 \end{bmatrix} \begin{bmatrix} \cos b & 0 & \sin b \\ 0 & 1 & 0 \\ -\sin b & 0 & \cos b \end{bmatrix} \quad (10\text{-}3)$$

$$\begin{bmatrix} 1 & 0 & 0 \\ 0 & \cos a & -\sin a \\ 0 & \sin a & \cos a \end{bmatrix} \begin{bmatrix} 0 \\ 0 \\ 1 \end{bmatrix} + \begin{bmatrix} xi \\ yi \\ zi \end{bmatrix}$$

$$= Th * \begin{bmatrix} \cos c \sin b \cos a + \sin c \sin a \\ \sin c \sin b \cos a - \cos c \sin a \\ \cos b \cos a \end{bmatrix} + \begin{bmatrix} xi \\ yi \\ zi \end{bmatrix}$$

Second Embodiment of the Present Invention

Although the tool direction is instructed as command tool direction vector (ic, jc, kc) in the first embodiment, the tool direction is often instructed by two rotating axes when controlling the tool center point position in conventional five-axis machine tools.

For example, in conventional five-axis machine tools without A axis (see FIG. 1), machining is often performed by controlling the tool center point by instructing the tool direction by B and C axis commands. If such a program with the tool direction instructed by the B and C axis commands (bc, cc) is used in a machine having three rotating axes, the three rotating axes can be controlled as in the first embodiment by converting the B and C axis commands (bc, cc) to a tool direction vector (ic, jc, kc) as in equations (11) below and performing the same processing as in the first embodiment by regarding the converted command tool direction vector (ic, jc, kc) as having been instructed as the tool direction. Accordingly, the three rotating axes can be controlled as in the first embodiment even with a command program for controlling the tool center point of a conventional five-axis machine tool using the B and C axis commands.

$$\begin{bmatrix} ic \\ jc \\ kc \end{bmatrix} = \begin{bmatrix} \cos cc & -\sin cc & 0 \\ \sin cc & \cos cc & 0 \\ 0 & 0 & 1 \end{bmatrix} \begin{bmatrix} \cos bc & 0 & \sin bc \\ 0 & 1 & 0 \\ -\sin bc & 0 & \cos bc \end{bmatrix} \begin{bmatrix} 0 \\ 0 \\ 1 \end{bmatrix} \quad (11)$$

$$= \begin{bmatrix} \cos cc \sin bc \\ \sin cc \sin bc \\ \cos bc \end{bmatrix}$$

The three rotating axes can also be controlled in a similar manner by a command program designed for a five-axis machine tool having two rotating axes (A and C axes or A and B axes).

Third Embodiment of the Present Invention

Although the tool direction is instructed by the command tool direction vector (ic, jc, kc) in the first embodiment of the present invention, the tool direction may be instructed by three rotating axes.

If a tool direction command is given with three rotating axis commands (ac, bc, cc) for A, B, and C axes, the same processing as in the first embodiment of the present invention can be performed by converting these commands into a command tool direction vector (ic, jc, kc) as in equations (12) below and regarding the converted command tool direction vector (ic, jc, kc) as having been instructed as the tool direction. With this, the three rotating axes can be controlled as in the first embodiment of the present invention even by a command program designed for controlling the tool center point by instructing the tool direction by the three rotating axes.

$$\begin{bmatrix} ic \\ jc \\ kc \end{bmatrix} = \begin{bmatrix} \cos cc & -\sin cc & 0 \\ \sin cc & \cos cc & 0 \\ 0 & 0 & 1 \end{bmatrix} \begin{bmatrix} \cos bc & 0 & \sin bc \\ 0 & 1 & 0 \\ -\sin bc & 0 & \cos bc \end{bmatrix} \quad (12)$$

$$\begin{bmatrix} 1 & 0 & 0 \\ 0 & \cos ac & -\sin ac \\ 0 & \sin ac & \cos ac \end{bmatrix} \begin{bmatrix} 0 \\ 0 \\ 1 \end{bmatrix}$$

$$= \begin{bmatrix} \cos cc \sin bc \cos ac + \sin cc \sin ac \\ \sin cc \sin bc \cos ac - \cos cc \sin ac \\ \cos bc \cos ac \end{bmatrix}$$

Similarly, the present embodiment is applicable in various ways for instructing the tool direction, for example, with the roll, pitch and yaw angles or the Euler angle.

Fourth Embodiment of the Present Invention

Figure 3:
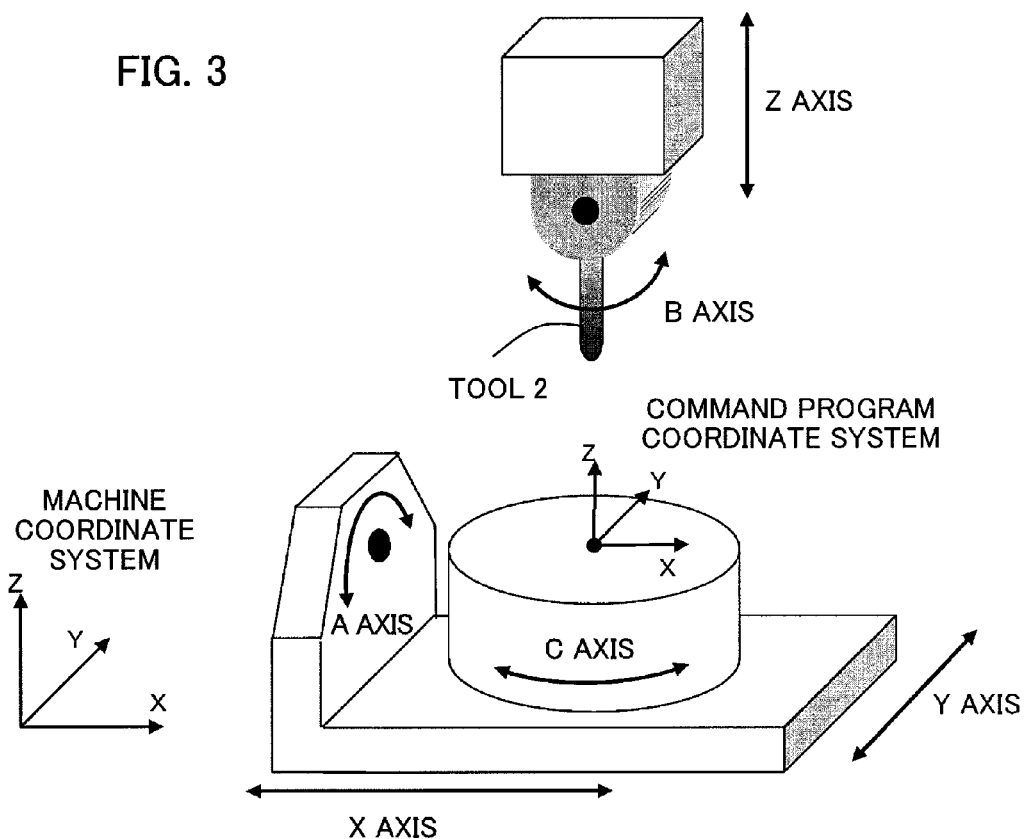
FIG. 3 illustrates a first example of a mixed type multi-axis machine tool.

Suppose that the mixed type multi-axis machine tool (two table rotating axes and one tool head rotating axis) in FIG. 3 is controlled in this embodiment. In this machine tool, the central axes of the two table rotating axes intersect with each other. A command program coordinate system exists on the rotating table and its coordinate origin is coincident with the center of rotation of the two table rotating axes. The command program coordinate system rotates as the rotating table rotates. A command tool direction vector (ic, jc, kc) is instructed on a command program coordinate system. The A and B axes have a movable range from −90 degrees to +90 degrees, while the C axis is movable through any number of rotations. The A axis position is expressed by a (radian), the B axis position is expressed by b (radian), and the C axis position is expressed by c (radian). When a=b=c=0, the tool direction coincides with the direction of the Z axis as shown in FIG. 3.

In the command program, the tool center point position on the command program coordinate system is instructed by the command positions (xc, yc, zc) on the linear axes X, Y, Z and the tool direction command is instructed by a command tool direction vector (ic, jc, kc). The instructed tool center point position (xc, yc, zc) and tool direction vector (ic, jc, kc) are interpolated for every interpolation period and the interpolated tool center point position (xi, yi, zi) and the interpolated tool direction vector (i, j, k) are thus determined. The relationship expressed by equation (13) is established between the interpolated tool direction vector (i, j, k) and a, b and c. This conversion equation depends on the machine configuration.

$$\begin{bmatrix} i \\ j \\ k \end{bmatrix} = \begin{bmatrix} \cos c & -\sin c & 0 \\ \sin c & \cos c & 0 \\ 0 & 0 & 1 \end{bmatrix} \begin{bmatrix} 1 & 0 & 0 \\ 0 & \cos a & -\sin a \\ 0 & \sin a & \cos a \end{bmatrix} \quad (13)$$

$$\begin{bmatrix} \cos b & 0 & \sin b \\ 0 & 1 & 0 \\ -\sin b & 0 & \cos b \end{bmatrix} \begin{bmatrix} 0 \\ 0 \\ 1 \end{bmatrix}$$

$$= \begin{bmatrix} \cos c \sin b + \sin c \sin a \cos b \\ \sin c \sin b - \cos c \sin a \cos b \\ \cos a \cos b \end{bmatrix}$$

The remaining processing is similar to the first embodiment of the present invention and description thereof is omitted. Also in the mixed type multi-axis machine tool (two table rotating axes and one tool head rotating axis) in the fourth embodiment shown in FIG. 3, the tool direction may be instructed by the rotating axis commands, not by the command tool direction vector, as in the second and third embodiments of the present invention. This also applies to the fifth and sixth embodiments described later. For computing the linear axis positions (xp, yp, zp), however, inverse transformation for C and A axes as table rotating axes are performed so that the command program coordinate system on the table is converted to the machine coordinate system, for equation (10-1) or (10-2) in the first embodiment.

The equation (14) below corresponds to equation (10-1). The equation (14) corresponds to equation (10-2), if (i, j, k) in equation (14) is changed to (iv, jv, kv). For computing the linear axis positions (xp, yp, zp) as in equation (14) below, the conversion from the command program coordinate system on the table to the machine coordinate system is also performed in the fifth and sixth embodiments described later. In equation (14), (Ptx, Pty, Ptz) is the position of the origin of the command program coordinate system on the machine coordinate system.

$$\begin{bmatrix} xp \\ yp \\ zp \end{bmatrix} = \begin{bmatrix} 1 & 0 & 0 \\ 0 & \cos a & \sin a \\ 0 & -\sin a & \cos a \end{bmatrix} \begin{bmatrix} \cos c & \sin c & 0 \\ -\sin c & \cos c & 0 \\ 0 & 0 & 1 \end{bmatrix} * \quad (14)$$

$$\left( Th * \begin{bmatrix} i \\ j \\ k \end{bmatrix} + \begin{bmatrix} xi \\ yi \\ zi \end{bmatrix} \right) + \begin{bmatrix} Ptx \\ Pty \\ Ptz \end{bmatrix}$$

Fifth Embodiment of the Present Invention

Figure 4:
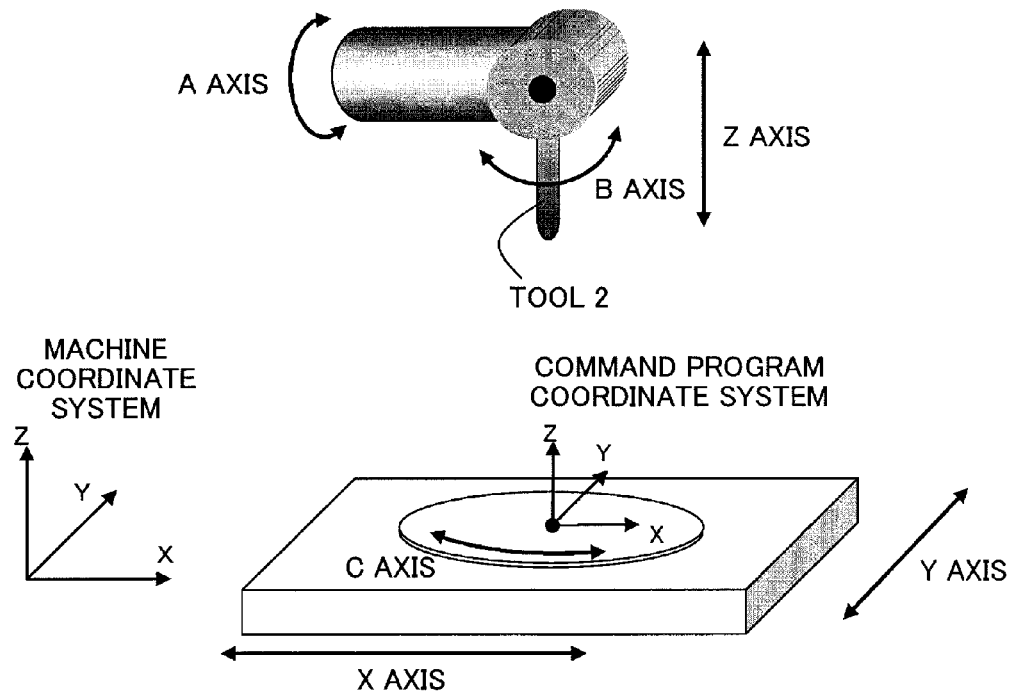
FIG. 4 illustrates a second example of a mixed type multi-axis machine tool.

Suppose that the mixed type multi-axis machine tool (one table rotating axis and two tool head rotating axes) in FIG. 4 is controlled in this embodiment. In this machine tool, the central axes of the two head rotating axes intersect with each other. The command program coordinate system exists on the rotating table and its coordinate origin is coincident with the center of rotation of the table rotating axis. The command program coordinate system rotates as the rotating table rotates. The command tool direction vector (ic, jc, kc) is instructed on the command program coordinate system. The A and B axes have a movable range from −90 degrees to +90 degrees, while the C axis is movable through any number of rotations. The A axis position is expressed by a (radian), the B axis position is expressed by b (radian), and the C axis position is expressed by c (radian). When a=b=c=0, the tool direction coincides with the direction of the Z axis as shown in FIG. 3.

In the command program, the tool center point position on the command program coordinate system is instructed by the command positions (xc, yc, zc) on the linear axes X, Y, Z and the tool direction command is instructed by a command tool direction vector (ic, jc, kc). The instructed tool center point position (xc, yc, zc) and tool direction vector (ic, jc, kc) are interpolated for every interpolation period and the interpolated tool center point position (xi, yi, zi) and the interpolated tool direction vector (i, j, k) are thus determined. The relationship expressed by equation (15) is established between the interpolated tool direction vector (i, j, k) and a, b, c.

$$\begin{bmatrix} i \\ j \\ k \end{bmatrix} = \begin{bmatrix} \cos c & -\sin c & 0 \\ \sin c & \cos c & 0 \\ 0 & 0 & 1 \end{bmatrix} \begin{bmatrix} 1 & 0 & 0 \\ 0 & \cos a & -\sin a \\ 0 & \sin a & \cos a \end{bmatrix} \quad (15)$$
$$\begin{bmatrix} \cos b & 0 & \sin b \\ 0 & 1 & 0 \\ -\sin b & 0 & \cos b \end{bmatrix} \begin{bmatrix} 0 \\ 0 \\ 1 \end{bmatrix}$$
$$= \begin{bmatrix} \cos c \sin b + \sin c \sin a \cos b \\ \sin c \sin b - \cos c \sin a \cos b \\ \cos a \cos b \end{bmatrix}$$

The remaining processing is similar to the first and fourth embodiments of the present invention and description thereof is omitted.

Sixth Embodiment of The Present Invention

Suppose that the table rotating type multi-axis machine tool in FIG. 5 is controlled in this embodiment. In this machine tool, the central axes of the three table rotating axes intersect with one another. A command program coordinate system exists on the rotating table and its coordinate origin is coincident with the center of rotation of the table rotating axes. The command program coordinate system rotates as the rotating table rotates. The command tool direction vector (ic, jc, kc) is instructed on a command program coordinate system. The A and B axes have a movable range from −90 degrees to +90 degrees, while the C axis is movable through any number of rotations. The A axis position is expressed by a (radian), the B axis position is expressed by b (radian), and the C axis position is expressed by c (radian). When a=b=c=0, the tool direction coincides with the direction of the Z axis as shown in FIG. 3.

In the command program, the tool center point position on the command program coordinate system is instructed by the command positions (xc, yc, zc) on the linear axes X, Y, Z and the tool direction command is instructed by a command tool direction vector (ic, jc, kc). The instructed tool center point position (xc, yc, zc) and tool direction vector (ic, jc, kc) are interpolated for every interpolation period and the interpolated tool center point position (xi, yi, zi) and the interpolated tool direction vector (i, j, k) are thus determined. The relationship expressed by equation (16) is established between the interpolated tool direction vector (i, j, k) and a, b, c. This conversion equation depends on the machine configuration.

$$\begin{bmatrix} i \\ j \\ k \end{bmatrix} = \begin{bmatrix} \cos c & -\sin c & 0 \\ \sin c & \cos c & 0 \\ 0 & 0 & 1 \end{bmatrix} \begin{bmatrix} \cos b & 0 & \sin b \\ 0 & 1 & 0 \\ -\sin b & 0 & \cos b \end{bmatrix} \quad (16)$$
$$\begin{bmatrix} 1 & 0 & 0 \\ 0 & \cos a & -\sin a \\ 0 & \sin a & \cos a \end{bmatrix} \begin{bmatrix} 0 \\ 0 \\ 1 \end{bmatrix}$$
$$= \begin{bmatrix} \cos c \sin b \cos a + \sin c \sin a \\ \sin c \sin b \cos a - \cos c \sin a \\ \cos b \cos a \end{bmatrix}$$

The remaining processing includes calculations similar to the first and fourth embodiments of the present invention and description thereof is omitted.

Figure 14:
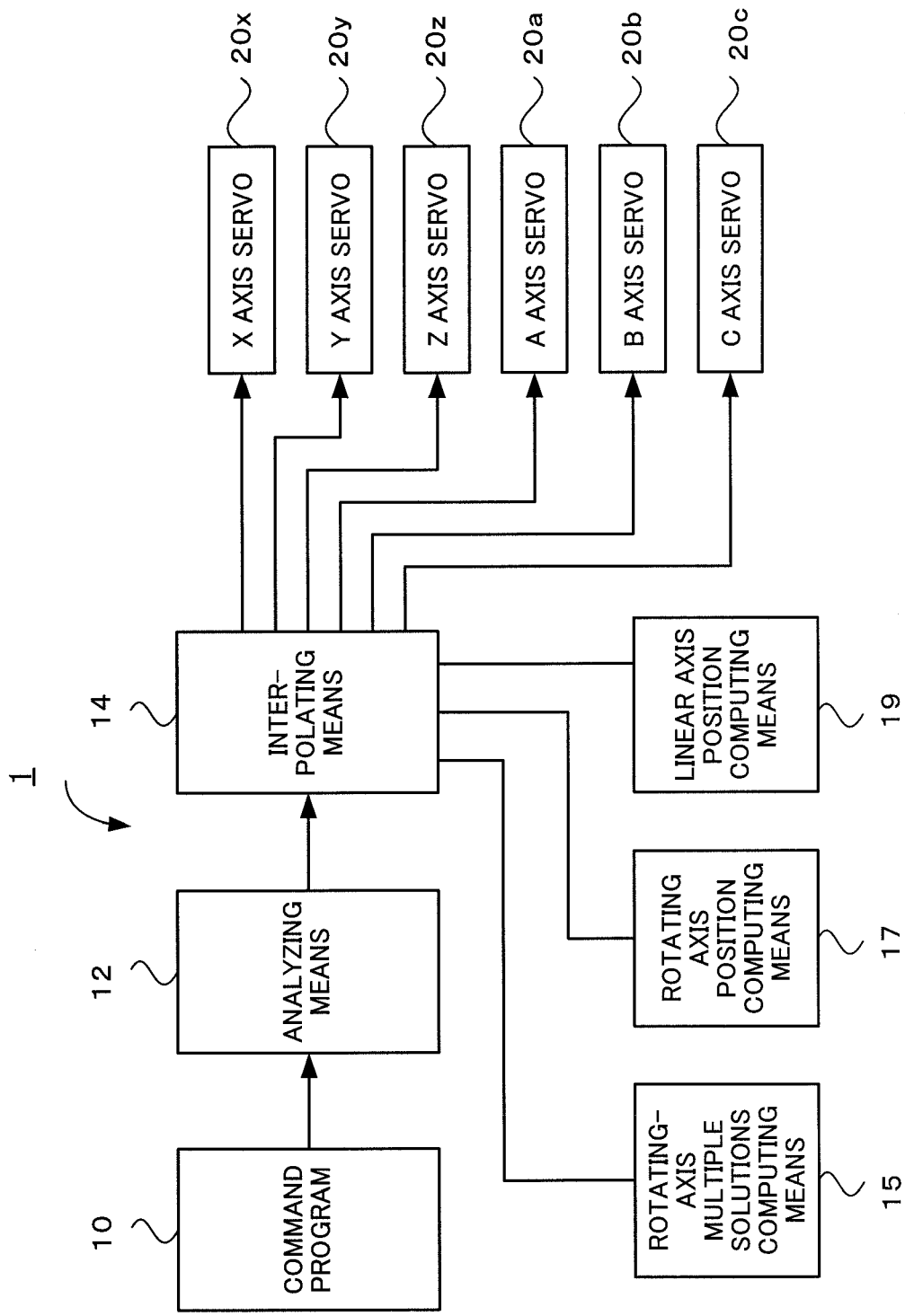
FIG. 14 is a functional block diagram of a numerical controller for controlling a multi-axis machine tool having three rotating axes.

FIG. 14 is a functional block diagram of a numerical controller for controlling a multi-axis machine tool having three rotating axes. In a numerical controller 1, a command program 10 is analyzed by an analyzing means 12, interpolation is performed by an interpolating means 14, and an X axis servo 20x, Y axis servo 20y, Z axis servo 20z, A axis servo 20a, B axis servo 20b, and C axis servo 20c are driven. A rotating-axis multiple solutions computing means 15, rotating axis position computing means 17, and linear axis position computing means 19 according to the present invention belong to the interpolating means as shown in FIG. 14.

Figure 15:
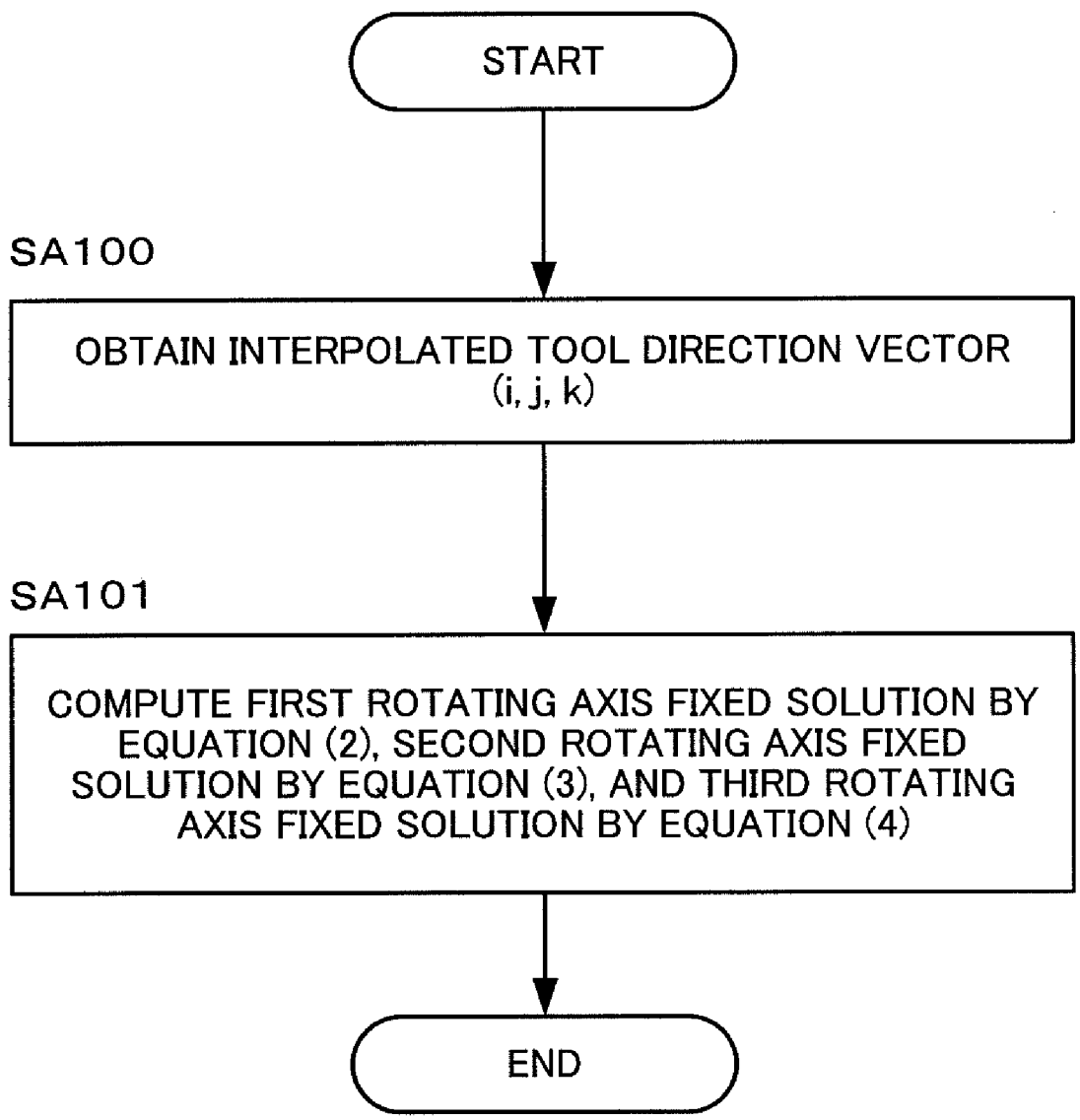
FIG. 15 is a flowchart illustrating the processing by a rotating-axis multiple solutions computing means in the numerical controller according to the present invention.

FIG. 15 is a flowchart illustrating a computation process executed by the rotating-axis multiple solutions computing means 15 shown in FIG. 14. The process will be described in the order of steps.

[Step SA100] An interpolated tool direction vector (i, j, k) is obtained.

[Step SA101] A first rotating axis fixed solution is computed by equation (2), a second rotating axis fixed solution is computed by equation (3), a third rotating axis fixed solution is computed by equation (4), and then the process ends.

Figure 16:
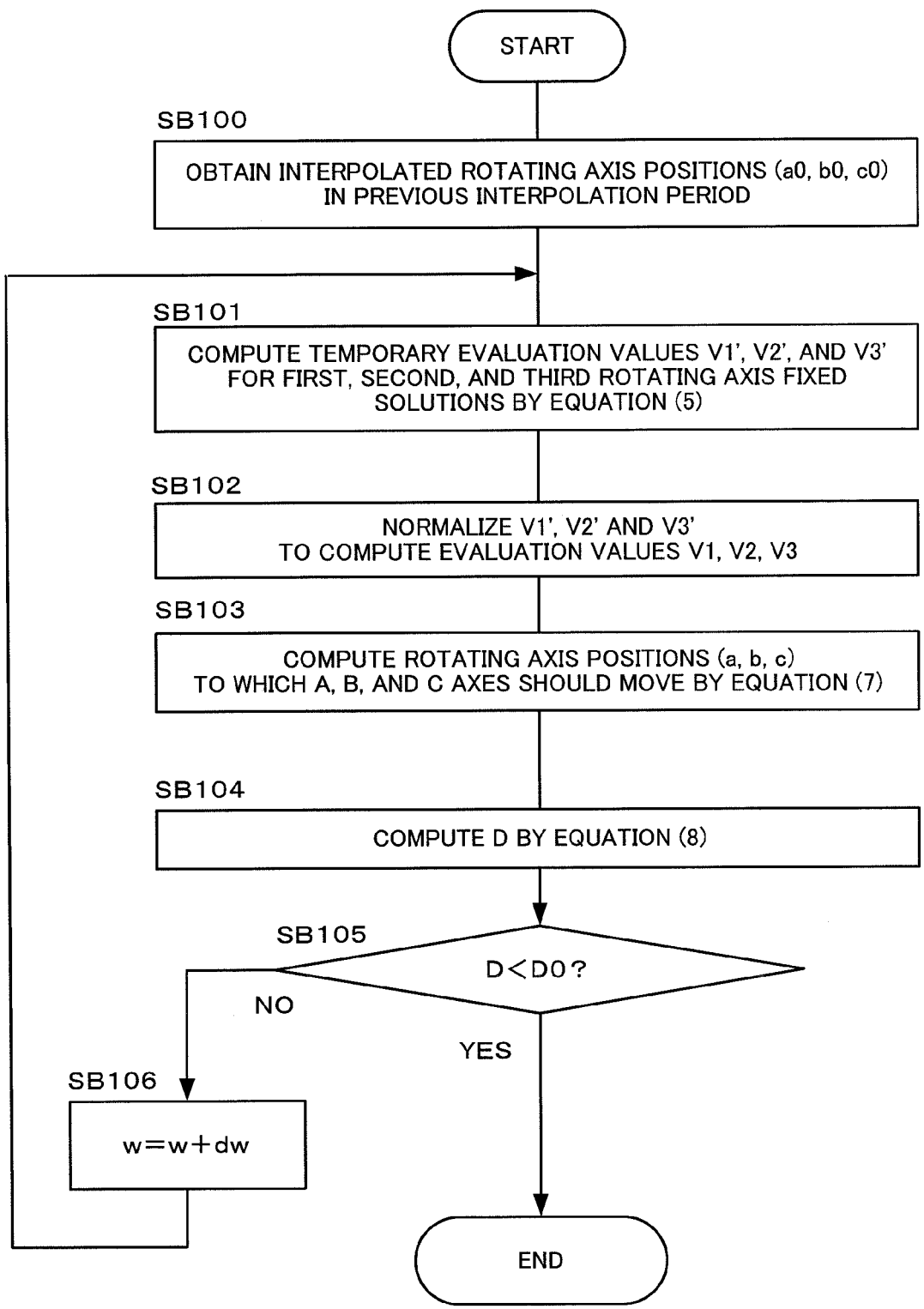
FIG. 16 is a flowchart illustrating the processing by a rotating axis position computing means in the numerical controller according to the present invention.

FIG. 16 is a flowchart illustrating the computation process executed by the rotating axis position computing means 17 in FIG. 15. The process will be described in the order of steps.

[Step SB100] Interpolated rotating axis positions (a0, b0, c0) in the previous interpolation period are obtained.

[Step SB101] Temporary evaluation values V1', V2', V3' for the first, second, and third rotating axis fixed solutions are computed by equations (5).

[Step SB102] The V1', V2', and V3' obtained in step SB101 are normalized to obtain evaluation values V1, V2, and V3.

[Step SB 103] The rotating axis positions (a, b, c) to which the A, B, and C axes should be moved are computed by equations (7).

[Step SB104] D is determined by equation (8) using the interpolated rotating axis positions (a0, b0, c0) obtained in step SB100, the evaluation values V1, V2, and V3 obtained in step SB102, and the rotating axis positions (a, b, c) obtained in step SB103.

[Step SB105] It is checked whether or not the D determined in step SB104 is smaller than the preset value D0; if smaller, the process ends and the a, b, c obtained in step SB103 become the positions to which the A, B, and C axes should be moved in the current interpolation period. If D is not smaller than D0, the process proceeds to step SB 106.

[Step SB106] w=w+dw is computed and the process returns to step SB101 to continue processing.

The invention claimed is:

1. A numerical controller for a multi-axis machine tool having a mechanism including at least three linear axes and at least three rotating axes for machining a workpiece attached to a table by rotating the table or a tool head, the numerical controller being adapted to instruct a tool center point position by linear axis positions on a command program coordinate system and giving a tool direction command to the multi-axis machine tool, the numerical controller comprising:
   rotating-axis multiple solutions computing means for obtaining an interpolated tool direction vector by interpolating the tool direction command for every interpolation period and computing multiple solutions for the three rotating axes, as a first rotating axis fixed solution assuming that a first rotating axis is fixed, a second rotating axis fixed solution assuming that a second rotating axis is fixed, and a third rotating axis fixed solution assuming that a third rotating axis is fixed, from the interpolated tool direction vector;
   rotating axis position computing means for computing three rotating axis positions by calculating evaluation values for highly evaluating smaller motion amounts in the multiple solutions, respectively, and synthesizing products of the motion amounts obtained respectively by the multiple solutions and the evaluation values, wherein smaller motion amounts are motion amounts that are less than a small amount threshold; and
   linear axis position computing means for obtaining an interpolated tool center point position by interpolating the tool center point position instructed for every interpolation period and then computing three linear axis positions on a machine coordinate system from the interpolated tool center point position, a tool length compensation amount and the positions of the rotating axes, wherein
   the numerical controller is operable to move the three rotating axes to the rotating axis positions determined by the rotating axis position computing means and to move the three linear axes to the linear axis positions determined by the linear axis position computing means.

2. The numerical controller according to claim 1, wherein the linear axis position computing means calculates the linear axis positions of the three linear axes on the machine coordinate system by multiplying the tool length compensation amount by the interpolated tool direction vector and adding the result to the interpolated tool center point position.

3. The numerical controller according to claim 1, wherein the rotating axis position computing means calculates the rotating axis positions of the three rotating axes by synthesizing the computed multiple solutions and obtains a verified tool direction vector which is a tool direction vector to be obtained from the calculated rotating axis positions of the three rotating axes, and wherein
   the linear axis position computing means calculates the linear axis positions of the three linear axes on the machine coordinate system by multiplying the tool length compensation amount by the verified tool direction vector and adding the result to the interpolated tool center point position.

4. The numerical controller according to claim 1, wherein the linear axis position computing means calculates the linear axis positions of the three linear axes on the machine coordinate system from the tool length compensation amount, the rotating axis positions of the three rotating axes and the interpolated tool center point position, using the following equation:

$$\begin{bmatrix} xp \\ yp \\ zp \end{bmatrix} = Th * \begin{bmatrix} \cos c & -\sin c & 0 \\ \sin c & \cos c & 0 \\ 0 & 0 & 1 \end{bmatrix} \begin{bmatrix} \cos b & 0 & \sin b \\ 0 & 1 & 0 \\ -\sin b & 0 & \cos b \end{bmatrix}$$
$$\begin{bmatrix} 1 & 0 & 0 \\ 0 & \cos a & -\sin a \\ 0 & \sin a & \cos a \end{bmatrix} \begin{bmatrix} 0 \\ 0 \\ 1 \end{bmatrix} + \begin{bmatrix} xi \\ yi \\ zi \end{bmatrix}$$
$$= Th * \begin{bmatrix} \cos c \sin b \cos a + \sin c \sin a \\ \sin c \sin b \cos a - \cos c \sin a \\ \cos b \cos a \end{bmatrix} + \begin{bmatrix} xi \\ yi \\ zi \end{bmatrix}.$$

5. The numerical controller according to claim 1, wherein the multiple solutions include a first rotating axis fixed solution to be obtained when assuming that a first rotating axis moves through a first rotating axis motion amount determined in a previous interpolation period, a second rotating axis fixed solution to be obtained when assuming that a second rotating axis moves through a second rotating axis motion amount determined in the previous interpolation period, and a third rotating axis fixed solution to be obtained when assuming that a third rotating axis moves through a third rotating axis motion amount determined in the previous interpolation period.

6. The numerical controller according to claim 1, wherein the rotating axis position computing means determines the verified tool direction vector from the determined three rotating axis positions, verifies whether or not a difference between the verified tool direction vector and the interpolated tool direction vector is within a preset tolerance, and, if the difference is not within the tolerance, repeats computing the positions of rotating axes by computing again the evaluation values so that the smaller amounts of motion are more highly evaluated.

7. The numerical controller according to claim 1, wherein the multi-axis machine tool rotates the tool head by the three rotating axes.

8. The numerical controller according to claim 1, wherein the multi-axis machine tool rotates the table by two of the three rotating axes and rotates the tool head by the remaining one rotating axis.

9. The numerical controller according to claim 1, wherein the multi-axis machine tool rotates the tool head by two of the three rotating axes and rotates the table by the remaining one rotating axis.

10. The numerical controller according to claim 1, wherein the multi-axis machine tool rotates the table by the three rotating axes.

11. The numerical controller according to claim 1, wherein the tool direction command is instructed by a tool direction vector.

12. The numerical controller according to claim 1, wherein the tool direction command is instructed by two rotating axis positions.

13. The numerical controller according to claim 1, wherein the tool direction command is instructed by three rotating axis positions.

* * * * *